United States Patent [19]

Morita

[11] Patent Number: 5,108,197
[45] Date of Patent: Apr. 28, 1992

[54] LINEAR MOTION GUIDE UNIT HAVING A LONG STROKE
[75] Inventor: Kunihiko Morita, Koganei, Japan
[73] Assignee: Nippon Thompson Co., Ltd., Tokyo, Japan
[21] Appl. No.: 675,640
[22] Filed: Mar. 25, 1991
[30] Foreign Application Priority Data
Mar. 26, 1990 [JP] Japan .................................. 2-76519
[51] Int. Cl.⁵ .............................................. F16C 29/06
[52] U.S. Cl. ..................................................... 384/45
[58] Field of Search ........................... 384/45, 43, 44; 464/168

[56] References Cited
U.S. PATENT DOCUMENTS 4,692,038  9/1987  Kasai ..................... 384/45
4,695,170  9/1987  Teramachi ............... 384/43
4,832,508  5/1989  Teramachi ............... 384/45
4,880,317  11/1989  Teramachi ............... 384/45

Primary Examiner—Lenard A. Footland
Attorney, Agent, or Firm—Skjerven, Morrill, MacPherson, Franklin & Friel

[57] ABSTRACT

A linear motion rolling contact guide unit includes a guide rail, a slider and a plurality of rolling members interposed between the guide rail and the slider. The guide rail is formed with a pair of upper inner guide grooves and a pair of lower inner guide grooves and the slider is formed with a pair of upper outer guide grooves and a pair of lower outer guide grooves correspondingly. The guide grooves are arranged such that two contact points between a rolling member and an associated upper pair of inner and outer guide grooves and two contact points between a rolling member and an associated lower pair of inner and outer guide grooves define a straight line. Preferably, the center of each of the rolling members also lies on the straight line.

6 Claims, 6 Drawing Sheets

LINEAR MOTION GUIDE UNIT HAVING A LONG STROKE

BACKGROUND OF THE INVENTION

1. Field of the Invention

This invention generally relates to a linear motion rolling contact guide unit suitable for use in various machining tools, precision processing machines and test apparatuses or the like, and, in particular, to a linear motion guide unit having a long stroke.

2. Description of the Prior Art

A linear motion rolling contact guide unit or simply LM guide is well known, and it generally includes a guide rail, a slider and a plurality of rolling members interposed between the rail and the slider to thereby allow to provide a relative motion between the rail and the slider along the rail. Such a linear motion guide unit may be used for guiding a relatively large load over a relatively long distance, and a typical example of such a linear motion guide unit having a long stroke is, for example, disclosed in the Japanese Utility Model Laid-open Pub. No. 61-97626, and another such example is shown in FIG. 4 of this application.

In the linear motion guide unit shown in FIG. 4, a pair of guide rails B and C extending straight is fixedly mounted on a bed A in parallel with sliders D and E slidably mounted on the guide rails B and C, respectively, and a slide table F is fixedly mounted on the sliders D and E bridging therebetween. Any desired object, such as a part of a robot, may be fixedly attached to the slide table F. The slide table F may move linearly in either direction back and forth as indicated by the double arrow G. Each of the guide rails B and C is formed with a pair of guide grooves H and I on its opposite side surfaces extending in parallel with the longitudinal axis of the rail. Each of the sliders D and E is formed with an endless circulating path, including a load path section, a return path section and a pair of curved connecting path sections, each connecting the corresponding ends of the load and return path sections, and a plurality of rolling members, such as balls or rollers, are provided in the endless circulating path. The load path section of the endless circulating path is located opposite to and spaced apart from the corresponding guide groove of the guide rail to thereby define a guide channel therebetween, so that those rolling members located in the guide channel are partly received in the corresponding guide groove. As a result, when a load is applied to the slide table F, it is absorbed by the rolling members interposed between the guide rails B and C and the sliders D and E. For this purpose, the guide grooves H and I and the rolling members are designed such that a proper preload is applied to the rolling members when assembled.

However, if there is an error in the parallel arrangement between the guide rails B and C, the sliding resistance of the slide table F varies as it slidingly moves along the guide rails B and C, which could shorten the life time and could significantly degrade the operational accuracy and performance. In order to avoid such disadvantages, the guide rails B and C must be mounted with a high positional accuracy, which then tends to push up the cost. Besides, if the guide rails B and C are relatively long, such as a few meters long, then it is almost impossible to mount these guide rails B and C with a required high accuracy on the order of a few microns over their entire lengths.

In addition, since the linear motion guide unit is assembled with preloading as described before, as shown in FIGS. 5 and 6, it is necessary to measure widths W1 and W2 of inner and outer guide grooves M and N of a guide rail J and a slider K, respectively, and then to select balls L having a diameter slightly larger than the difference between the measured widths W1 and W2 before assembling so as to provide a desired preloading between the balls L and the guide rail J and the slider K when assembled. However, in this case, since the direction of transmission of force, which is defined by connecting contact points a, b, c and d between the rolling member L and the guide grooves M and N and the center e of the rolling member L and which corresponds to the direction of elastic deformation of the guide grooves M and N and the rolling members L, is a direction which differs from the direction for measusring widths W1 and W2 and which does not allow to make direct measurements, it is extremely difficult and almost impossible to carry out a proper management of preloading.

Also in the case of the structure shown in the before-mentioned Japanese Utility Model Laid-open Pub. No. 61-97626 as shown in FIG. 7, the straight lines defined by connecting the contact points between the rolling memmber P and the guide grooves S and Q and the center of the rolling member P and by connecting the contact points between the rolling member O and the guide grooves T and R and the center of the rolling member O extend in directions which have nothing to do with the direction for measuring widths W1 and W2. Thus, in this case also, it is impossible to directly measure the amount of elastic deformation of various parts of interest.

SUMMARY OF THE INVENTION

In accordance with the present invention, there is provided a linear motion rolling contact guide unit which generally comprised a guide rail, a slider slidably mounted on the guide rail and a plurality of rolling members, such as balls or rollers, interposed between the guide rail and the slider to provide a rolling contact therebetween. The guide rail extends straight over a desired length and it has a generally rectangular cross section. The guide rail is formed with a pair of upper, inner guide grooves and a pair of lower, inner guide grooves, each of the guide grooves extending in parallel with the longitudinal axis of the guide rail. The slider has a horizontal section and a pair of vertical sections each depending from a corresponding side of the horizontal section so that the slider has a generally U-shaped cross section.

The slider is formed with a pair of upper, outer guide grooves, each of which is located opposite to a corresponding one of the pair of upper, inner guide grooves of the guide rail, and a pair of lower, outer guide grooves, each of which is also located opposite to a corresponding one of the pair of lower, inner guide grooves of the guide rail. Each of the inner guide grooves is associated with a corresponding one of the outer guide grooves to define a guide channel therebetween, which corresponds to a load path section of an endelss circulating path which will be described below. The slider is also formed with four endless circulating paths, each including a load path section, a return path section and a pair of curved path sections connecting the corresponding ends of the load and return path sections. The load path section of an endless circulating path corresponds to one of the upper and lower outer guide grooves of the slider. A plurality of rolling members, such as balls or rollers, are located in each of the endless circulating paths.

In accordance with the present invention, the inner and outer guide grooves are arranged such that a first straight line is defined by connecting two contact points between a rolling member and a first upper pair of associated inner and outer guide grooves and two contact points between a rolling member and a first lower pair of associated inner and outer guide grooves and a second straight line is defined by connecting two contact points between a rolling member and a second upper pair of associated inner and outer guide grooves and two contact points between a rolling member and a second lower pair of associated inner and outer guide grooves. Preferably, the first and second straight lines thus defined extend symmetrically with respect to the vertical center line of the guide rail. In one embodiment of the present invention, the two contact points between a first rolling member and an associated first upper pair of inner and outer guide grooves and the two contact points between a second rolling member and an associated first lower pair of inner and outer guide grooves lie on the first straight line and they are located on a first side with respect to the vertical center line of the guide rail; whereas, the two contact points between a third rolling member and an associated second and thus remaining upper pair of inner and outer guide grooves and the two contact points between a fourth rolling member and an associated second and thus remaining lower pair of inner and outer guide grooves lie on the second straight line and they are located on a second side, which is opposite to the first side, with respect to the vertical center line of the guide rail.

Alternatively, in another embodiment of the present invention, the first two contact points between a first rolling member and an associated first upper pair of inner and outer guide grooves and the second two contact points between a second rolling member and an associated first lower pair of inner and outer guide grooves lis on the first line with the first two contact points located on a first side and the second two contact points located on a second side, which is opposite to the first side, with respect to the vertical center line of the guide rail; whereas, the third two contact points between a third rolling member and an associated second and thus remaining upper pair of inner and outer guide grooves and the fourth two contact points between a fourth rolling member and an associated second and thus remaining lower pair of inner and outer guide grooves lie on the second straight line with the third two contact points located on the second side and the fourth two cotnact points located on the first side with respect to the vertical center line of the guide rail.

With the above-described structure, a preloaded condition or elastic deformation condition for design dimensions can be easily and accurately calculated and thus a desired proloading condition can be set and maintained properly. Moreover, an automatic centering function can be provided to the slider. Thus, even if there is an error in the dimension of the guide rail, for example in its height, such an error is properl absorbed. More particularly, even if there is an error in the parallel arrangement of two guide rails on the order of a few microns, such an error can be properly absorbed, thereby allowing to maintain an excellent performance of the sliding motion of the slider along the guide rail. This is advantageous since it facilitates the mounting operation of the guide rails.

It is therefore a primary object of the present invention to provide an improved linear motion rolling guide unit having a relatively large stroke.

Another object of the present invention is to provide an improved linear motion rolling contact guide unit which allows to carry out preload management with ease and high accuracy.

A further object of the present invention is to provide an improved linear motion rolling contact guide unit smoon in operation, long in service life, high in accuracy and low at cost.

A still further object of the present invention is to provide an improved linear motion rolling contact guide unit including a pair of parallel guide rails suitable for supporting a heavy load.

Other objects, advantages and novel features of the present invention will become apparent from the following detailed description of the invention when considered in conjunction with the accompanying drawings.

DESCRIPTION OF THE PREFERRED EMBODIMENTS

Figure 1:
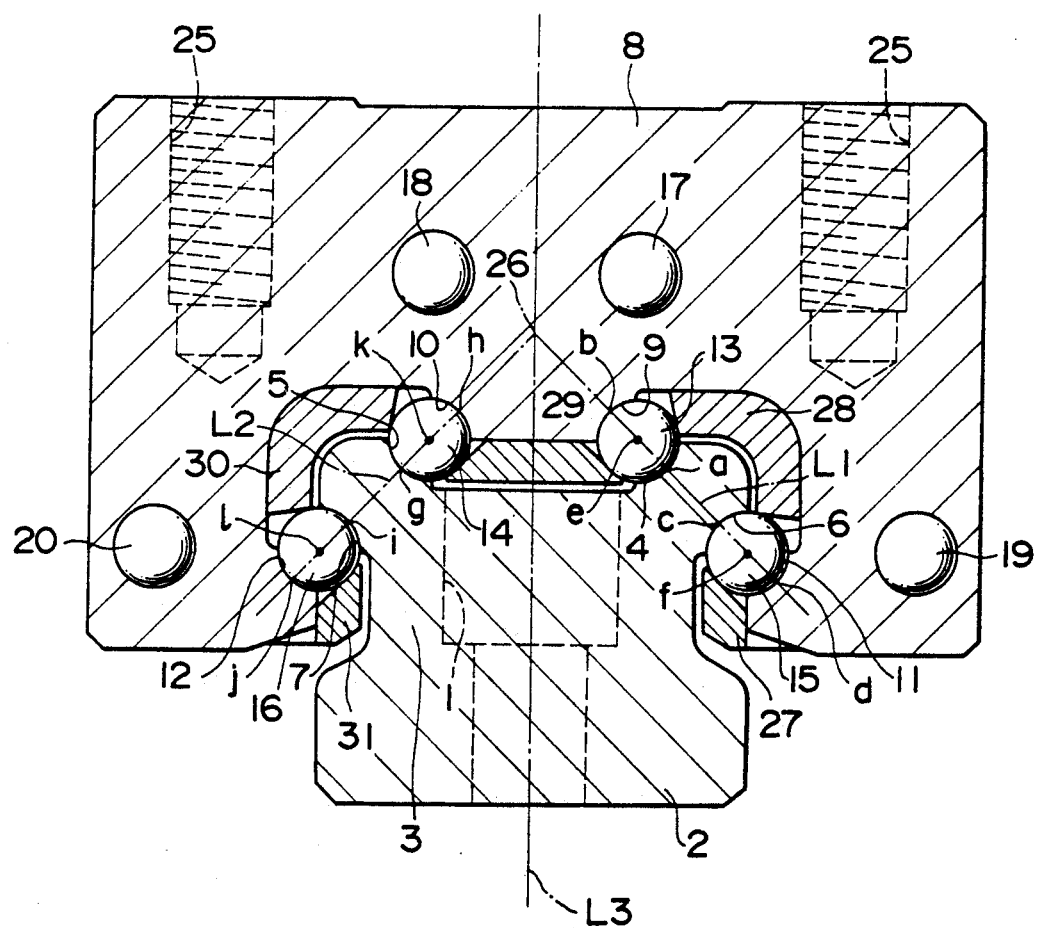
FIG. 1 is a schematic illustration showing in transverse cross sectional view a linear motion rolling contact guide unit constructed in accordance with one embodiment of the present invention.
Figure 2:
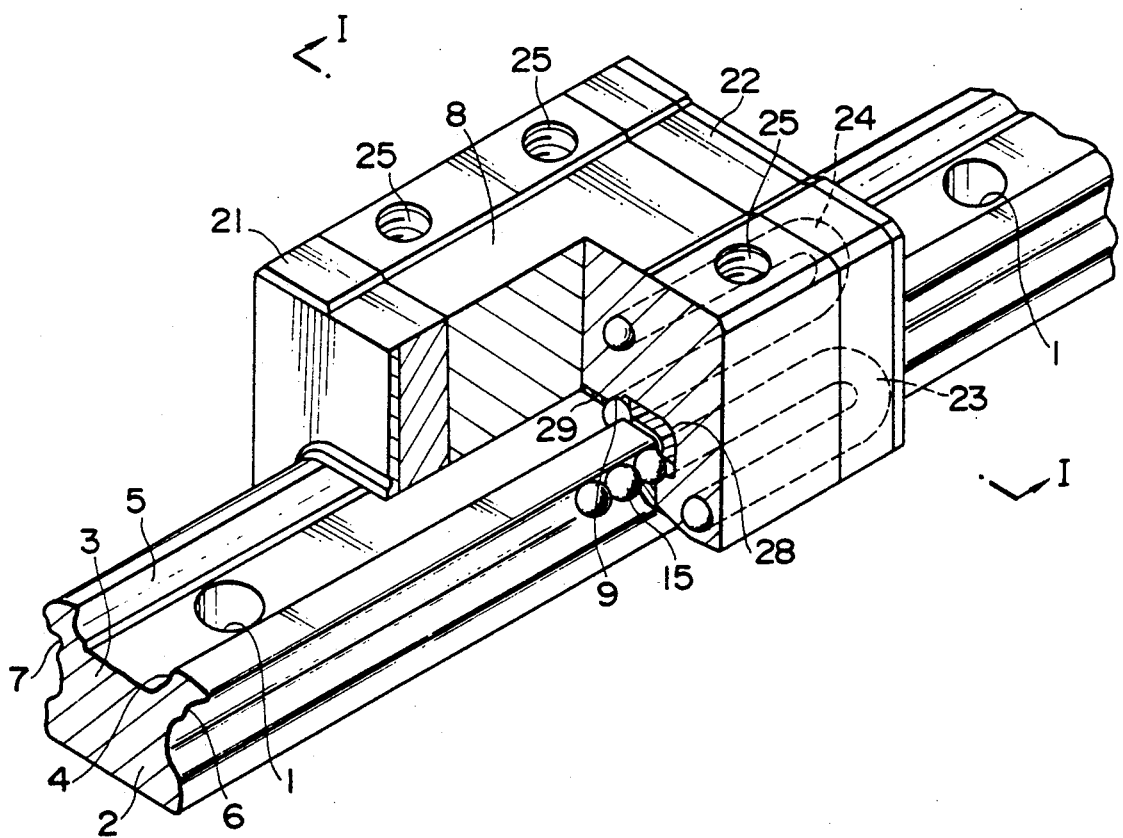
FIG. 2 is a schematic illustration showing in perspective view with part broken away the guide unit of FIG. 1.
Figure 4:
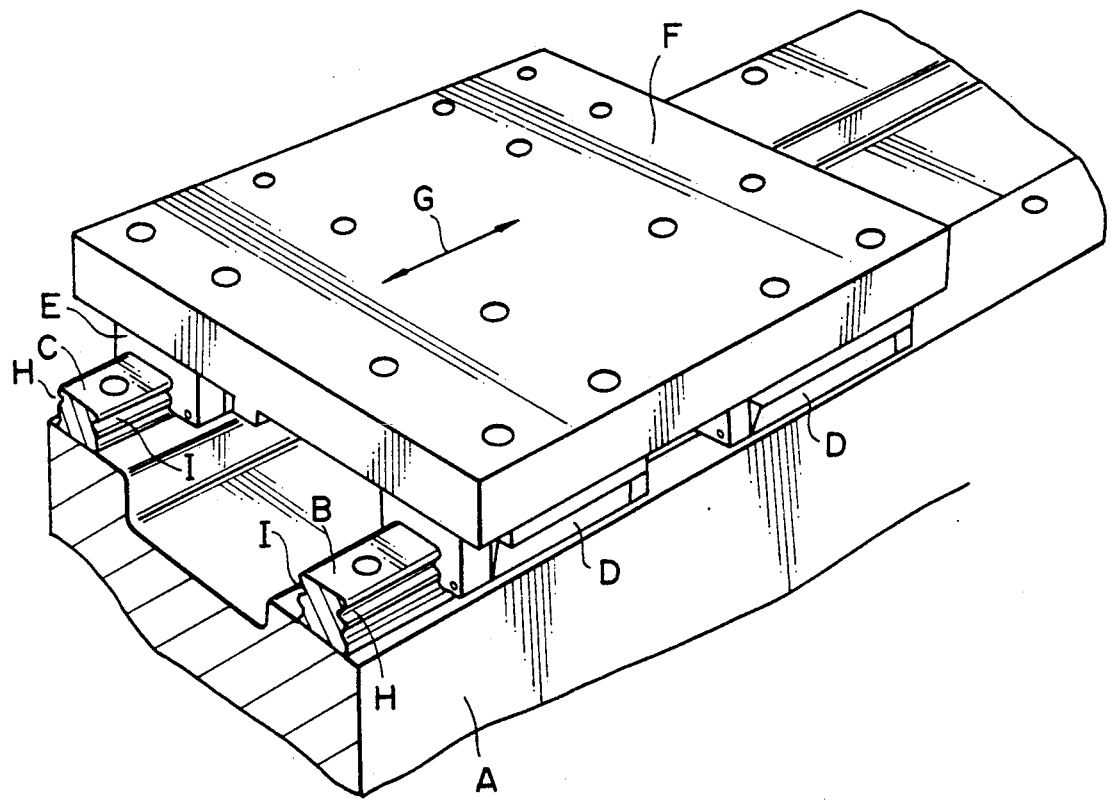
FIG. 4 is a schematic illustration showing in perspective view a typical prior art linear motion rolling contact guide unit assembly suitable for supporting a relatively heavy load.
Figure 5:
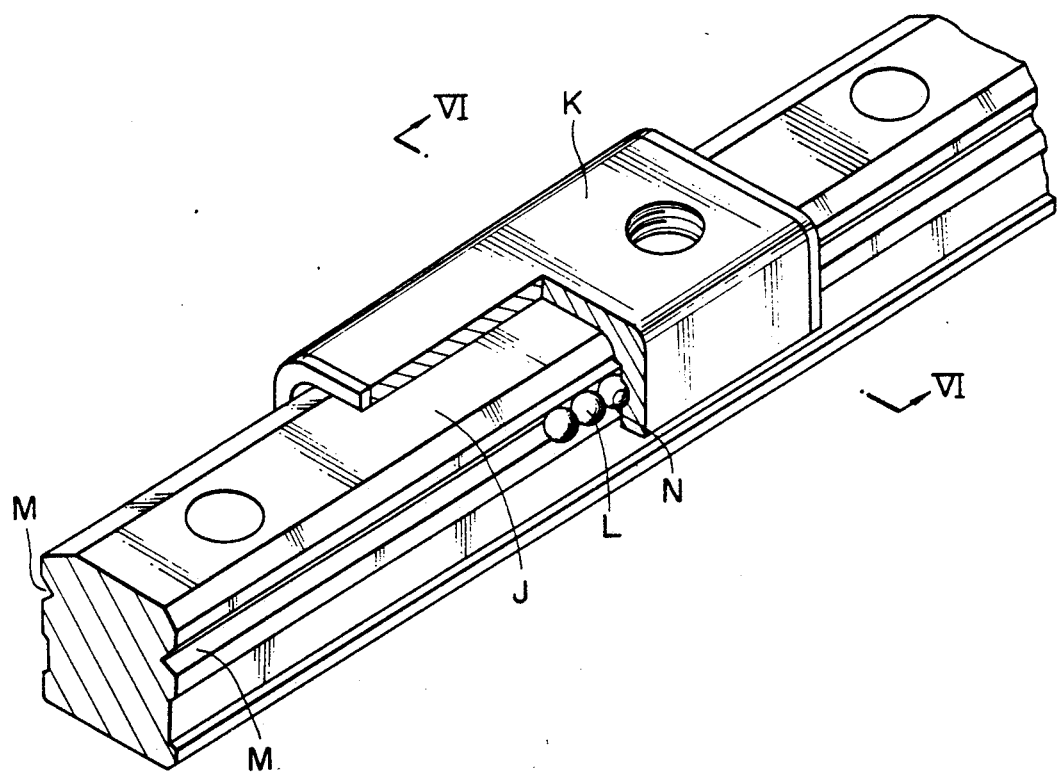
FIG. 5 is a schematic illustration showing in perspective view the linear motion guide unit forming a part of the assembly shown in FIG. 4.
Figure 6:
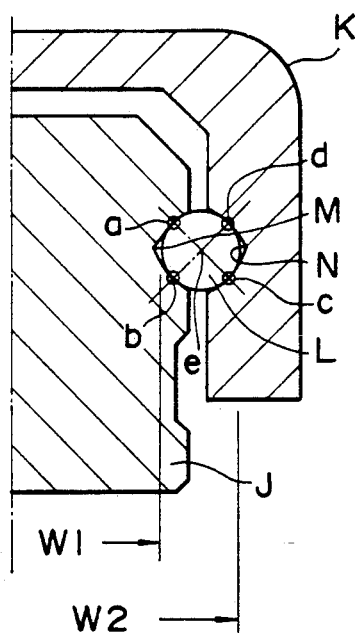
FIG. 6 is a schematic illustration showing in cross section the right-hand half of the structure shown in FIG. 5.
Figure 7:
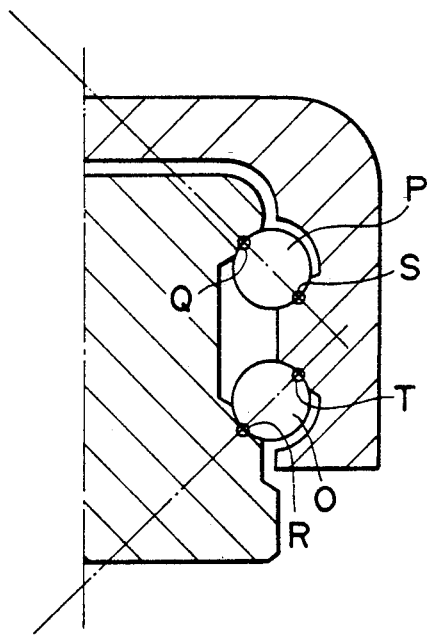
FIG. 7 is a schematic illustration showing in cross section the right-hand half of the cross sectional structure of another similar prior art linear motion guide unit.

Referring now to FIGS. 1 and 2, there is schematically shown a linear motion rolling contact guide unit constructed in accordance with one embodiment of the present invention. As shown, the present linear motion guide unit includes a guide rail 2 which extends straight over a desired length. The guide rail 2 has a predetermined cross sectional shape, and, in the illustrated embodiment, the guide rail 2 has a generally rectangular cross sectional shape. The guide rail 2 is provided with a plurality of mounting holes 1 extending from its top surface to its bottom surface, so that the guide rail 2 can be fixedly mounted on any desired object, such as the bed A in FIG. 4, by means of bolts.

Importantly, the guide rail 2 has a guide portion 3 which is formed with a pair of upper, inner guide grooves 4 and 5 and another pair of lower, inner guide grooves 6 and 7. Each of these upper and lower inner guide grooves 4–7 extends straight in parallel with the longitudinal axis of the guide rail 2. In the illustrated embodiment, the upper, inner guide grooves 4 and 5 are formed generally at the top surface of the guide rail 2 and the lower, inner guide grooves 6 and 7 are formed generally at the opposite side surfaces of the guide rail 2. As shown in FIG. 1, each of the top and side surfaces of the guide rail 2 is recessed at its center so that a generally mushroom-shaped section is fromed at the top right and top left corners of the guide rail 2.

A slider 8 is slidably mounted on the guide rail 2. The slider 8 has a horizontal section located above the top surface of the guide rail 2 and a pair of vertical sections each depending from a corresponding end of the horizontal section. Thus, the slider 8 has a generally U-shaped cross section. The slider 8 is formed with a pair of upper, outer guide grooves 9 and 10 and a pair of lower, outer guide grooves 11 and 12. Each of the outer guide grooves 9, 10, 11, 12 is located opposite to and separated away from a corresponding one of the inner guide grooves 4, 5, 6 and 7 to thereby define a guide channel which corresponds to a load path section of an endelss circulating path as will be described below. That is, the slider 8 is provided with four separate endless circulating paths, each including a load path section, a return path section and a pair of cuved connecting path sections, each connecting the corresponding ends of the load and return path sections. For example, one of the four endless circulating paths includes a load path section, correspoinding to the guide channel defined by a pair of oppositely located inner and outer guide grooves 4 and 9, a return path section 17 and a pair of cuved connecting path sections, one of which is shown as 24 in FIG. 2. That is, the slider 8 has a pair of front and rear end blocks 21 and 22, which are separately manufactured but combined with a center block to define the entire slider 8 and which are formed with connecting path sections, such as 23 and 24 as shown in FIG. 2.

Thus, the second endless circulating path provided in the slider 8 includes a load path section corresponding to a guide channel defined by a pair of oppositely located inner and outer guide grooves 6 and 11, a return path section 19 and a pair of cuved connecting path sections, one of which is shown as 23 in FIG. 2. The third endless circulating path includes a load path section corresponding to a guide channel defined by a pair of oppositely located inner and outer guide grooves 5 and 10, a return path section 18 and a pair of curved connecting path sections. Likewise, the fourth endless circulating path includes a load path section corresponding to a guide channel defined by a pair of oppositely located inner and outer guide grooves 7 and 12, a return path section 20 and a pair of curved connecting path sections.

A plurality of rolling members, or balls 13–16 in the illustrated embodiment, are provided in each of the endless circulating paths. For example, the ball 13 is located in a guide channel defined by an associated pair of upper inner and outer guide grooves 4 and 9, and the ball 14 is located in a guide channel defined by an associated pair of upper inner and outer guide grooves 5 and 10. In addition, the ball 15 is located in a guide channel defined by an associated pair of lower inner and outer guide grooves 6 and 11, and the ball 16 is located in a guide channel defined by an associated pair of lower inner and outer guide grooves 7 and 12. For example, the ball 13 rolls along the guide channel or load path section defined by the associated pair of upper inner and outer guide grooves 4 and 9 while the slider 8 moves along the guide rail 2 and then the ball 13 will move into the return path section 17 through one of the associated pair of curved connecting path sections, or the connecting path section 24 shown in FIG. 2. Then as the slider 8 further moves along the guide rail 2, the ball 17 which has entered into the return path section 17 moves in a backward direction along the return path section 17 to be finally returned to the guide channel or load path section through the other curved connecting path section. In this manner, since the balls 13, 14, 15 and 16 recirculate in their respective endless circulating paths, the slider 8 may move along the guide rail 2 no matter how long it may be. As a result, there can theoretically be provided an indefinite linear motion between the guide rail 2 and the slider 8.

The slider 8 is also formed with a plurality of mounting holes 25 which are threaded in the illustrated embodiment. Thus, the slider 8 may also be fixedly attached to any desired object, such as the slide table F in the structure shown in FIG. 4, using bolts.

In accordance with one aspect of the present invention, as shown in FIG. 1, the inner and outer guide grooves 4, 5, 6, 7, 9, 10, 11 and 12 are arranged in a particular relationship. That is, the ball 13 is in rolling contact with the upper inner guide groove 4 at a point a and with the upper outer guide groove 9 at a point b, and the ball 15 is in rolling contact with the lower inner guide groove 6 at a point c and with the lower outer guide groove 11 at a point d. The center of each of the balls 13 and 15 is indicated by e and f, respectively. As shown by the one dot line in FIG. 1, an imaginary straight line L1 may be defined by connecting these points of contact a, b, c and d. In the illustrated embodiment, the centers e and f of the respective balls 13 and 15 also lie on the straight line L1. Similarly, the ball 14 is in rolling contact with the upper inner guide groove 5 at a point g and with the upper outer guide groove 10 at a point h, and the ball 16 is in rolling contact with the lower inner guide groove 7 at a point i and with the lower outer guide groove 12 at a point j. The center of each of the balls 14 and 16 is indicated by k and l, respectively. As also shown by the one dot line in FIG. 1, another imaginary straight line L2 may be defined by connecting these points of contact g, h, i and j. In the illustrated embodiment, the centers k and l of the respective balls 14 and 16 also lie on the straight line L2.

Also shown by the one dot line in FIG. 1 is a vertical center line L3 which passes through the center of the guide rail 2 vertically. In the illustrated embodiment, the first and second straight lines L1 and L2 extend symmetrically with respect to the vertical center line L3 so that a merging point 26 between the first and second straight lines L1 and L2 lie on the vertical center line L3.

With this structure, the location of the merging point 26 can be specified as a design value and the amount of elastic deformation of an associated part under preloaded condition can also be specified. As a result, a desired preloading condition can be accurately determined. Besides, the amount of deformation due to preloading can be measured accurately. Moreover, the points of contact a, b, c, d, g, h, i and j are arranged generally in a circular arc and the merging point 26 between the straight lines L1 and L2 is located on the vertical center line L3 so that an automatic centering function is provided to the slider 8. Accordingly, even if there is an error on the order of a few microns in height nd/or parallelism when two such guide rails 2 are provided as in FIG. 4, such an error can be absorbed without any problem so that the slider 8 can execute its linear motion without any problem along its associated guide rail 2.

It is to be noted that a plurality of ratainers 27, 28,29, 30 and 31 are fixedly attached to the slider 8 as shown in FIG. 1 so as to keep the balls 9, 10, 11 and 12 in position.

Figure 3:
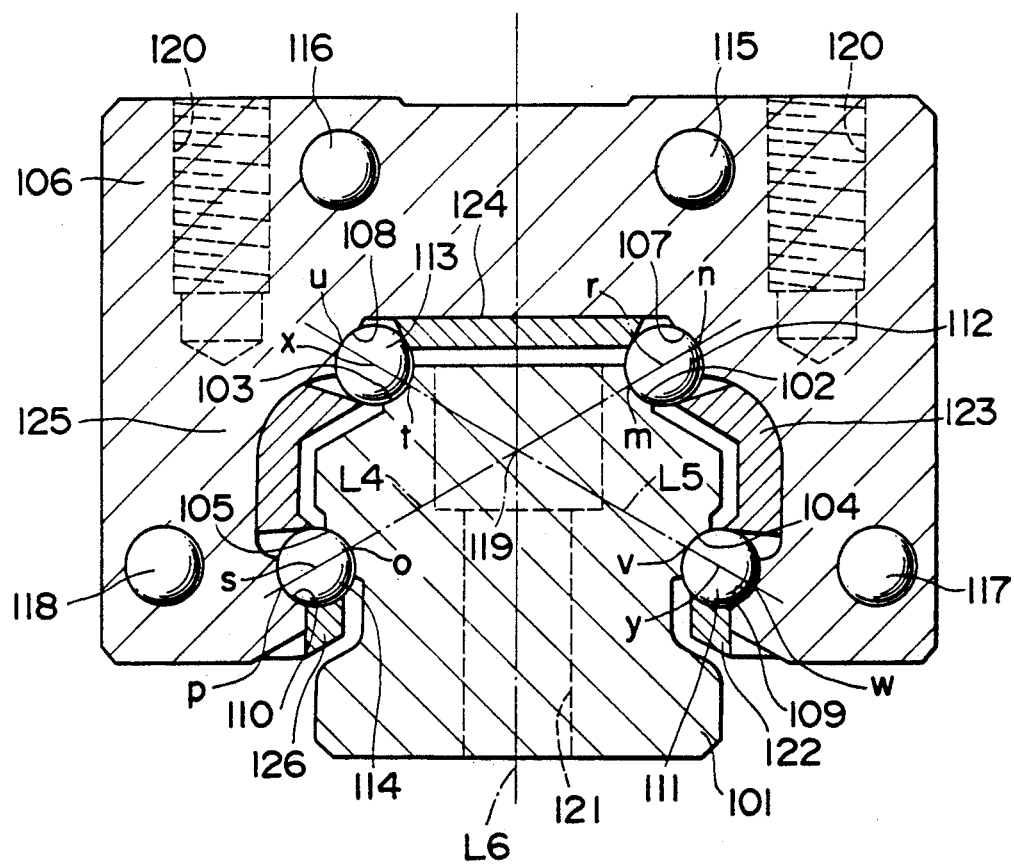
FIG. 3 is a schematic illustration showing in transverse cross sectional view a linear motion rolling contact guide unit constructed in accordance with another embodiment of the present invention.

Referring now to FIG. 3, there is schematically shown a linear motion rolling contact guide unit constructed in accordance with another embodiment of the present invention. As shown in FIG. 3, this linear motion guide unit includes a guide rail 101 which has a pair of upper, inner guide grooves 102 and 103 at its top right and left corners and a pair of lower, inner guide grooves 104 and 105 approximately at the center of respective side surfaces. A slider 106 has a horizontal section extending horizontally above the top surface of the guide rail 101 and a pair of vertical sections each depending from a corresponding end of the horizontal section, so that the slider 106 has a generally U-shaped cross section. The slider 106 is slidably mounted on the guide rail 101 in a straddling fashion. The slider 106 is formed with a pair of upper outer guide grooves 107 and 108 located opposite to the the pair of upper inner guide grooves 102 and 103, respectively, and a pair of lower outer guide grooves 109 and 110 located opposite to the pair of lower inner guide grooves 104 and 105, respectively. Thus, a guide channel is defined by each pair of associated inner and outer guide grooves, such as 102 and 107, 103 and 108, 104 and 109, and 105 and 110.

Similarly as described with respect to the previous embodiment, the slider 106 is formed with four endless circulating paths, each including a load path section, a return path section, such as 115, 116, 117, or 118, and a pair of curved connecting path sections, each connecting the corresponding ends of the load and return path sections, and the guide channel defined by associated inner and outer guide grooves corresponds to the load path section of the endless circulating path. A plurality of rolling members, or balls in the illustrated embodiment, are provided in each of the endless circulating paths. For example, a ball 112 is located in the load path section or guide channel defined by the associated inner and outer guide grooves 102 and 107 and a ball 113 is located in the load path section or guide channel defined by the associated inner and outer guide grooves 103 and 108; whereas, a ball 111 is located in the load path section or guide channel defined by the associated inner and outer guide grooves 104 and 109 and a ball 114 is located in the load path section or guide channel defined by the associated inner and outer guide grooves 105 and 110. Thus, a rolling contact is provided between the guide rail 101 and the slider 106. These balls 111, 112, 113 and 114 are set under a predetermined preloading condition.

In this embodiment, the ball 112 at top right is in rolling contact with the upper inner guide groove 102 at a point m and with the upper outer guide groove 107 at a point n and the ball 114 at bottom left is in rolling contact with the lower inner guide groove 105 at a point o and with the lower outer guide groove 110 at a point p. And, an imaginary straight line L4 is defined by connecting these points of contact m, n, o and p. Each of the balls 112 and 114 has a center r or s, which also lies on the straight line L4. Similarly, the ball 113 at top left is in rolling contact with the upper inner guide groove 103 at a point t and with the upper outer guide groove 108 at a point u and the ball 111 at bottom right is in rolling contact with the lower inner guide groove 104 at a point v and with the outer guide groove 109 at a point w. And, another imaginary straight line L 5 is defined by connecting these points of contact u, t, v and w. Each of the balls 111 and 113 has a center y or x, which also lies on the straight line L5.

In the illustrated embodiment, these two straight lines L4 and L5 merge at a point 119 which also lies on a vertical center line L6 of the guide rail 101 or the unit itself. Thus, the straight lines L4 and L5 extend symmetrically with respect to the vertical center line L6.

The present embodiment is identical to the previously described embodiment in function. As shown in FIG. 3, the slider 106 is formed with a plurality of mounting holes 120 which are threaded, so that any desired object, such as the slide table F shown in FIG. 4, may be fixedly attached to the slider 160 by means of bolts. The guide rail 101 is also formed with a plurality of mounting holes 121 so that the guide rail 101 may also be fixedly attached to any desired object, such as the bed A in FIG. 4. The unit shown in FIG. 3 is also provided with a plurality of retainer plates 122, 123, 124, 125 and 126 which are appropriately provided to keep the balls in position during operation.

While the above provides a full and complete disclosure of the preferred embodiments of the present invention, various modifications, alternate constructions and equivalents may be employed without departing from the true spirit and scope of the invention. Therefore, the above description and illustration should not be constructed as limiting the scope of the invention, which is defined by the appended claims.

What is claimed is:

1. A linear motion rolling contact guide unit, comprising:

a guide rail extending over a desired length and formed with a pair of upper, inner guide grooves and a pair of lower, inner guide grooves;

a slider formed with a pair of upper, outer guide grooves each located opposite to a corresponding one of said upper, inner guide grooves to define a guide channel therebetween and a pair of lower, outer guide grooves each located opposite to a corresponding one of said lower, inner guide grooves to define a guide channel therebetween; and a plurality of rolling members provided in each of said guide channels to thereby provide a rolling contact between said guide rail and said slider;

whereby said guide grooves are arranged such that a first straight line is defined by connecting two contact points present between a rolling member and a first pair of associated upper, inner and outer guide grooves and two contact points present between a rolling member and a second pair of associated lower inner and outer guide grooves and another straight line is defined by connecting two contact points between a rolling member and a third remaining pair of associated upper, inner and outer guide grooves and two contact points present between a rolling member and a fourth remaining pair of associated lower inner and outer guide grooves.

2. The guide unit of claim 1, wherein each of the rolling members has a center which also lies on an associated one of said first and second straight lines.

3. The guide unit of claim 2, wherein said first and second pairs are located at one side with respect to a vertical center line of said guide rail and said third and fourth remaining pairs are located at the opposite side with respect to said vertical center line.

4. The guide unit of claim 3, wherein a merging point between said first and second straight lines lies on said vertical center line.

5. The guide unit of claim 2, wherein said first and second pairs are located on opposite sides with respect to a vertical center line of said guide unit and said third and fourth remaining pairs are also located on opposite sides with respect to said vertical center line.

6. The guide unit of claim 5, wherein a merging point between said first and second straight lines lies on said vertical center line.

* * * * *